UNITED STATES PATENT OFFICE.

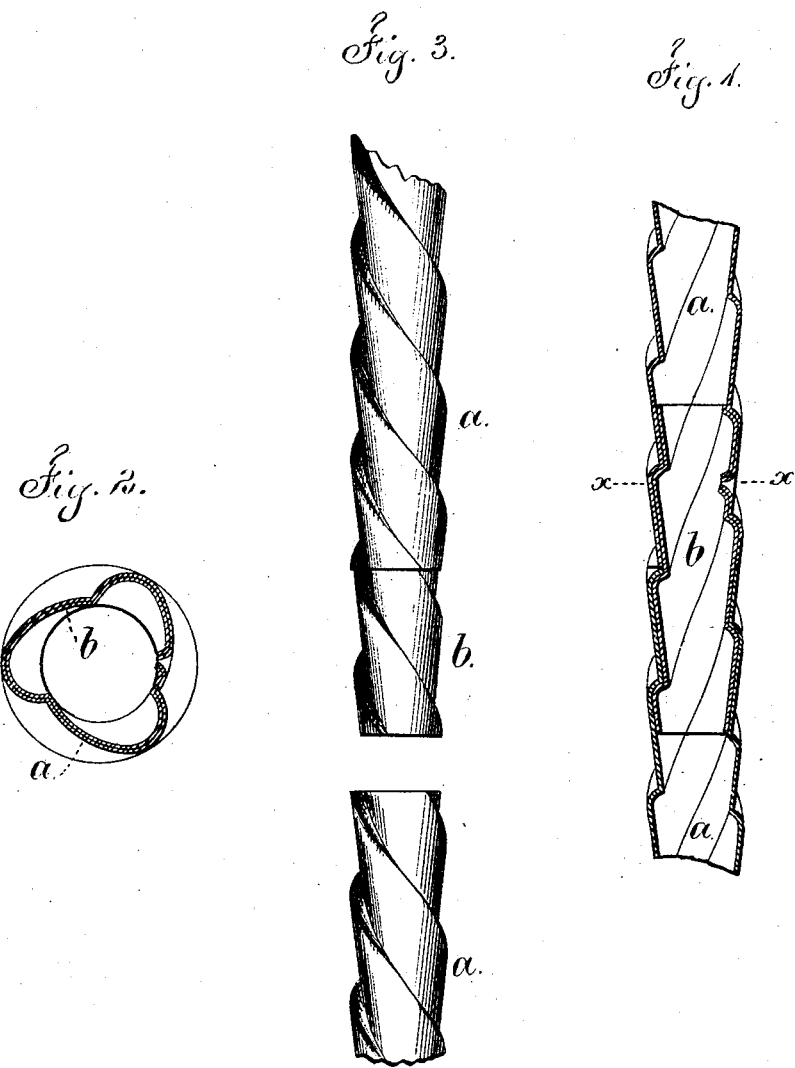

HENRY L. COE, OF CLIFTON, NEW JERSEY, ASSIGNOR TO THE MANHATTAN BRASS COMPANY, OF NEW YORK, N. Y.

IMPROVEMENT IN LIGHTNING-RODS.

Specification forming part of Letters Patent No. 173,905, dated February 22, 1876; application filed January 24, 1876.

*To all whom it may concern:*

Be it known that I, HENRY L. COE, of Clifton, Passaic county, New Jersey, have invented an Improvement in Lightning-Rods, of which the following is a specification:

Lightning-rods have been made of a strip of metal more or less twisted, and in some instances such strip has been bent into a tubular form and slightly twisted. The connections, however, between one length and the next have not been rigid and reliable, and the conductor has been more or less open, so that rain could penetrate; hence this tube is liable to become oxidized upon the inside, and when water accumulates in winter and freezes, the tube is split open and injured.

My invention is made for securely connecting the tubes together for excluding water, and for facilitating the bending of the tube.

I employ a complete brazed or seamless tube of thin metal, bent to a screw-form, having two or more depressions running around such tube so as to form a complete screw, and to connect the lengths together a similar tubular section is employed, the same being sufficiently small to pass inside the respective ends, or to pass outside, such coupling section and the rods being screwed together, thereby making a very firm joint, and the convolutions of the pipe produced by the bending of the metal allows of the tube being bent easily in passing the lightning-rod around the angles and projections of the building.

In the drawing, Figure 1 is a vertical section of the rod. Fig. 2 is a section at the line *x x*, in larger size; and Fig. 3 shows the end of one section with the projecting coupling-tube.

The metal tube *a* is preferably of copper, with the joint brazed, so as to be water-tight. The screw-form grooves are bent in the tube by machinery in the manner usual in manufacturing ornamental tubes. This screw-formed groove allows the tube to be bent around the angles or projections of buildings without the tube becoming flattened at such bends.

The coupling section *b* is of a size and shape to screw within or upon the end of one length of tube, to which it is firmly attached by a dent or compression made in the two thicknesses of the metal, and the end of the next tube is screwed into or upon this coupling-connecting section, so that the simple tubes and sections made as aforesaid are adequate to form the entire lightning-rod, and such rod is substantially water-tight.

The points or tips are of any usual or desired character.

I claim as my invention—

1. The lightning-rod made of a complete brazed or seamless tube of thin metal, having screw-formed ribs bent in the metal, in combination with the complete tubular coupling with similar screw-formed ribs, for uniting the lengths of tubing by the sheet-metal screws thus formed, as set forth.

2. The screw tubular section secured into the end of one length of the screw tubular lightning-rod and screwing into the next length of tube, substantially as set forth.

Signed by me this 17th day of January, 1876.

HENRY L. COE.

Witnesses:
GEO. T. PINCKNEY,
CHAS. H. SMITH.